Jan. 19, 1971 SHOHJI OHTA ET AL 3,556,938
APPARATUS FOR MANUFACTURING MICA SHEETS
Filed May 8, 1967 2 Sheets-Sheet 1
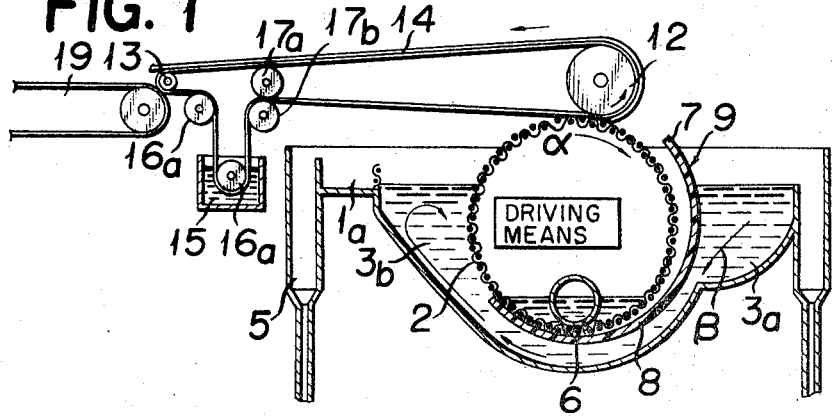
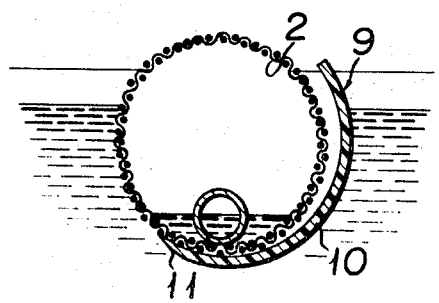
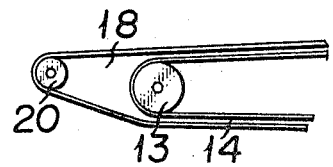
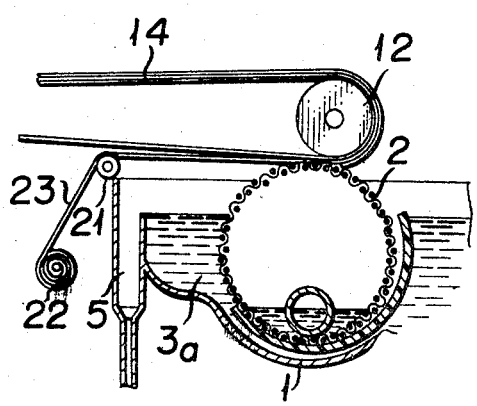
Shohji Ohta
Kazuo Ohkuri
INVENTORS
BY George D. Augspth
Attorney

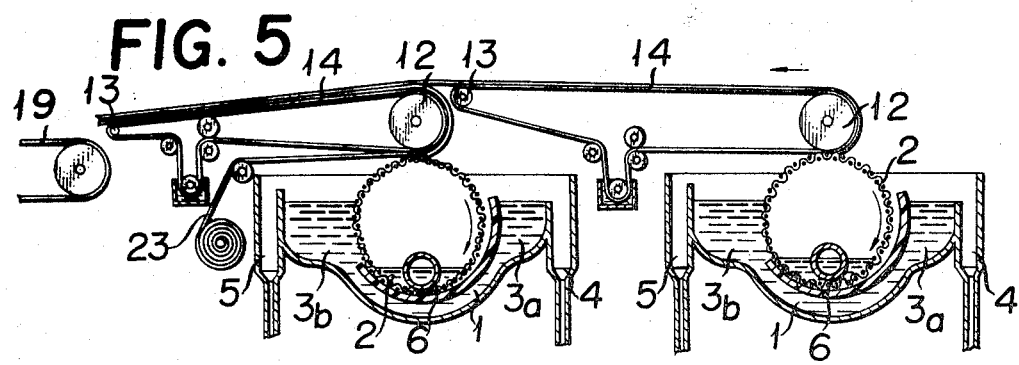
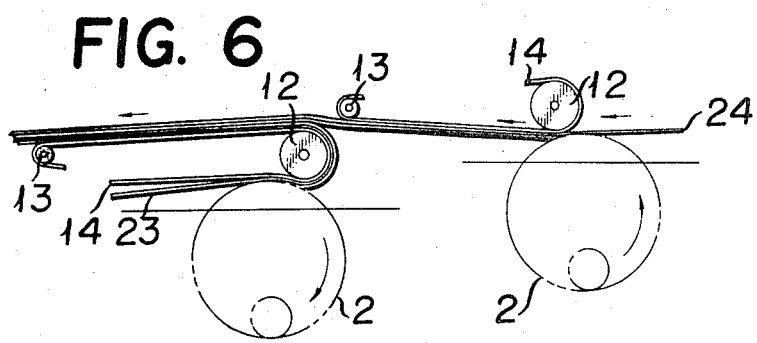
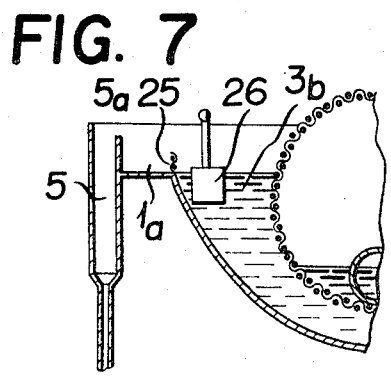

United States Patent Office 3,556,938
Patented Jan. 19, 1971

3,556,938
APPARATUS FOR MANUFACTURING MICA SHEETS
Shohji Ohta, Yokohama-shi, and Kazuo Ohkuri, Tokyo, Japan, assignors to Nippon Rika Kogyosho Co., Ltd., Tokyo, Japan, a corporation of Japan
Filed May 8, 1967, Ser. No. 636,986
Int. Cl. D21f 2/00
U.S. Cl. 162—306      3 Claims

ABSTRACT OF THE DISCLOSURE

The apparatus comprises a rotary cylindrical net disposed in a fluid vat and a conveyor, located close to said rotary net, which picks up laminated mica from the rotary net and conveys the same. Located in said vat are two interconnecting sections (3a, 3b) with a narrow arcuate passageway between said sections below said net. The water pressure outside the cylindrical net is made higher than that inside the net at all times so that water in the tank may flow into and through the cylindrical net. The water in the fluid vat is forced into high-speed turbulent flow in section (3b) whereby the flake mica dispersed in the water moves at random and strikes and clings to the net.

BACKGROUND OF THE INVENTION

The present invention relates to an apparatus for manufacturing mica sheets from flake mica in the form of boards and tapes consisting of a single web or a lamination of webs of mica or a lamination of a mica web or webs and paper or glass cloth sheet or sheets.

Mica sheets are usually made of either reconstituted mica or flake mica. One piece of reconstituted mica generally has an area of 0.5 to 15 mm.$^2$, a thickness of 0.00001 to 0.0001 mm. and its weight is difficult to measure. On the other hand one piece of flake mica has an area of 100 mm.$^2$ a thickness of 0.01 to 0.03 mm. and a weight of 0.05 to 0.2 g.

The reconstituted mica is extremely small in particle size as described above, so that it can float in water. This property of reconstituted mica is utilized in the manufacture of mica sheets which are usually made by causing reconstituted mica to float in water in a suspended state and urging it against a wire screen so that the reconstituted mica may gather on the wire screen. As the mica sheet obtained by the aforementioned method consists of extremely small particles of reconstituted mica, the binding between individual particles accumulated into a sheet form is extremely weak and the produced sheet is mechanically fragile. Also with a sheet consisting of such small particles, low-resistivity portions in the borderface between adjacent particles are formed substantially linearly along the thickness of the sheet to lessen the characteristic of the sheet to avoid corona discharge. Further, reconstituted mica is more expensive as the raw material than flake mica so that the resultant mica sheet is correspondingly higher priced.

In contrast when a mica sheet is formed from flake mica the aforementioned disadvantage will not exist as each piece or particle of mica has appreciable area and thickness. The flake mica, however, does not float in water as its specific gravity is greater than the specific gravity of water, so that the aforementioned procedure of manufacturing sheets can not be utilized. A method of manufacturing flake mica sheet which has heretofore been in practice is what is called the snow tower process which superposes a web of flake mica on paper or glass cloth by air spraying the flake mica into space and causing it to descend over the substrate. According to this process, however, uniformity in dispersion of mica is very difficult to obtain so that it is necessary to form a sheet having a very large average thickness to deposit mica compactly without leaving an opening in the sheet. Consequently, equalization of thickness of the accumulated mica sheet must be made manually by displacing or rearranging portions of mica from sections having a great accumulation to other sections having a lesser accumulation and filling eyes or openings in the sheets in order that the sheets may be useful. Thus production efficiency has been very low.

SUMMARY OF THE INVENTION

According to the present invention there is provided an apparatus for manufacturing mica sheets comprising a rotary cylindrical net disposed in a water tank, means for picking up and conveying an accumulated mica web or sheet formed on the net, means to keep water level and water pressure outside the cylindrical net higher than those inside the net and to cause high-speed turbulent flow of water in the outer vicinity of the net by suitable means and means to throw flake mica into the turbulent streams of water.

The particles of flake mica thrown into turbulent streams of water float violently in the stream, and are urged against the cylindrical net by the pressure of streams crossing the net to the interior thereof. As the flake mica floats with the stream, it sticks to and clogs the net and prevents turbulent streams from crossing the net in the area covered with it, the carrying of flake mica to this area becomes less frequent and the turbulent streams tend to cross the net in the areas not covered with the flake mica. Thus the net is covered with the flake mica progressively.

In this way, an excellent layer or web of mica having a substantially uniform thickness, which is very small constituted by two or three pieces of flake mica laid on one another, with no eyes or openings or extremely few if any may be formed on the net. Accordingly, the past situation, to the effect that although flake mica sheets were superior than the reconstituted mica sheets in mechanical strength and characteristic of withstanding corona discharge they were more expensive than the reconstituted mica sheets has drastically changed and the mass production of flake mica has been made possible, so that the demand for flake mica may be greatly increased.

BRIEF DESCRIPTION OF THE DRAWING

FIG. 1 is a schematic sectional view of the apparatus embodying the invention;

FIG. 2 shows a modification of a shelter means of the apparatus shown in FIG. 1;

FIG. 3 shows a modification of a pick-up conveyer of the apparatus shown in FIG. 1;

FIG. 4 shows a further modification of a pick-up conveyer of the apparatus according to the invention;

FIG. 5 is a schematic sectional view of another embodiment of the apparatus according to the invention;

FIG. 6 shows a still further modification of the pick-up conveyer; and

FIG. 7 is a partial schematic sectional view of a further embodiment of the apparatus according to the invention.

DETAILED DESCRIPTION OF THE INVENTION

Referring to FIG. 1, the apparatus according to the invention includes a water tank or vat 1 having a semi-cylindrical central bottom recess portion. Within the tank 1 is disposed a cylindrical net 2 which is rotatable a driving means not shown in the clockwise as indicated by an arrow α, and which is of substantially the same type as that of ordinary paper-making machines, consisting of an endless wire net of about 5 mm. meshes. The opposite ends of the cylindrical net 2 are in frictional contact with the end walls of the tank 1. Between the central bottom recess of the tank 1 and the lower portion of the cylindrical net 2 is defined a narrow arcuate space. On opposite sides of the cylindrical net 2 there are relatively broad spaces or sections 3a and 3b. The upper portion of the cylindrical net 2 extends above the top brim of the tank 1 i.e., the water level of the tank. A water supply pipe 4 is open on the upper right hand of the water tank 1, a water discharge pipe 6 is open to and communicates with the interior of the cylindrical net 2, and on the left hand of the water tank 1 beyond a mica take-up table 1a is open a drain pipe 5. The water discharged from drain pipe 5 and discharge pipe 6 is returned to the tank 1 through supply pipe 4 by a pump (not shown), thereby ensuring circulation of water by replenishing water lost in the circulation. The cylindrical net 2 is provided with a shelter or partition 9 consisting of an arcuate band of water-impervious and plastic material such as a cloth coated with vinyl chloride resin, of which one end is pivoted with a small roll 7 disposed at the wall of tank 1 and there is in close proximity of the cylindrical net 2 from the upper right hand part up to the lower left hand part. The shelter 9 substantially prevents streams of water from being introduced into the cylindrical net 2 from the outside, except at that part of said net which is not covered by the shelter, and defines the narrow arcuate space between it and the surface of the central recessed bottom. In this respect, it may alternatively consist of a metal plate 10 disposed in close vicinity of the periphery of the net 2 and surrounded with a water-impervious and plastic cloth as shown in FIG. 2. In close on upper portion the cylindrical net 2 is provided a pick-up conveyer comprising an endless band 14 braced round a press roll 12 disposed over the cylindrical net 2 and around a small-diameter roll 13. The endless band 14 is lightly pressed against the cylindrical net 2 by the press roll 12 and is driven in the direction opposite to the direction in which the cylindrical net 2 rotates and in braced round guide rolls 16a and 16b such that it may be dipped in water in a small water trough 15 provided outside the water tank 1 and is squeezed between squeeze rolls 17a and 17b, one of which also serves as a guide roll. It is made of felt, blanket and the like. An endless cloth band 18 of a thin cloth of polyethylene fluoride fiber guided by a roller 20 may be superposed on the felt band 14 as shown in FIG. 3. Below the left hand end of the endless band 14 is disposed one end of a metal net conveyer 19.

The pick-up band 14 is passed through the small water trough 15 and is squeezed between squeeze rolls 17a and 17b to be wetted to a suitable extent. When water is continuously supplied into the water tank 1 from the supply pipe 4, water flows in the direction of arrow β in FIG. 1 and is rendered into turbulent streams in the space 3b and enters the cylindrical net 2 at its side not sheltered by shelter 9, and is discharged from the discharge pipe 6. The flake mica thrown in the water tank 1 at the right side in the broad space 3a, is engulfed in the water stream described above, passes through the arcuate narrow gap between the cylindrical net 2 and the bottom wall of the water tank 1, reaches the left side of the cylindrical net 2, the broad space 3b and thereafter it adheres to the outer surface the cylindrical net 2. As the water streams passing through the narrow arcuate space between the cylindrical net 2 and the bottom wall of the water tank 1 are rapid while the streams in the relatively broad space 3b are slow as compared to the speed of flow through the narrow space, the flake mica is whirled up from the narrow space into the broader space 3b to float there and is urged against the cylindrical net 2 by water streams proceeding toward the discharge pipe 6 in the cylindrical net 2 to adhere to the periphery of the net 2. The extra flake mica which has not adhered to the net 2 tend to descend downwards in the space 3b due to gravity but its descent is actually prevented by the water streams coming from the narrow arcuate space so that it is kept floating in the space 3b. As the water tank 1 is of such configuration as described, favorable floatation of mica is ensured. The area of the net 2 covered by the mica prevents passage of water therethrough to the inside of the net 2, so that crossing of the water streams through the net 2 takes place in areas other than those areas covered by the mica, thereby causing mica continuously thrown into the tank 1 to progressively adhere to the cylindrical net 2. As the cylindrical net 2 is in rotation in the clockwise sense, water streams cross the net 2 at the region immediately above the lower end of the shelter 9 in the space 3b at all times. When the net 2 is clogged with mica accumulated in great quantities, entering of water into the cylindrical net 2 is temporarily prevented, so that the water level in the space 3b is raised and overflow of water into the drain pipe 5 takes place, thus ultimately regulating the amount of adhesion or accumulation of mica onto the net 2.

The flake mica accumulated on the outer surface of the cylindrical net 2 is continuously transferred to and conveyed by the pick-up band 14 in the form of a layer. When the flake mica layer comes to the left hand end of the pick-up band 14 it advances in the forward direction by toughness its own mechanical strength since the band 14 is arcuately bent at this end where the tension roll 13 having a very small diameter is disposed, thereby it is transferred to transport conveyer 19.

The mica in the form of layer on the conveyer 19 is applied with varnish, dried and then cut to required dimension or wound up into rolls to produce final product.

In the tank 1 the region where the flake mica float in the space 3b is determined by the amount of water supplied, i.e., the amount of water entering the cylindrical net 2, the volume of the space 3b, the average size of pieces of flake mica, the length of the shelter 9 and other factors.

By using a cylindrical net 2 of about 5 mm. meshes, the passing of pieces of flake mica through the net 2 together with water can be prevented. The small water trough 15 is provided for washing off particles of mica remaining stuck to the endless band 14 after the layer of flake mica has transferred to the transport conveyer and at the same time wetting the endless band 14. It is desirable that the diameter of the tension roll 13 be made as small as possible for ensuring separation of the layer of flake mica from the pick-up band 14 at its left hand end, but reduction in diameter of the tension roll 13 will inevitably decrease the life of the pick-up band 14 which is made of felt. To avoid this disadvantage an endless band 18 of a thin cloth may be superposed over the outer surface of the endless band 14 and braced round a roll 20 of sufficiently small diameter at the end spaced from the left hand end of the endless felt band 14 which is braced round a roll 13 of a comparatively large diameter, so that the felt band can be bent less sharply to increase its life as shown in FIG. 3.

In the embodiment described above, there is provided a mica receiving table 1a adjacent the left side of the space 3b. Alternatively, the height as shown in FIG. 7 of an intervening net screen 25 may be made lower than the height of the open end 5a of the drain pipe 5 and adjacent the screen 25 may be provided a stirring mechanism having a stirring plate 26 which makes reciprocating motion along the screen 25. With this arrangement, when water overflows the screen 25 which has been clogged with excessive mica on its side facing the space 3b the stirring means may be actuated such that the stirring plate 26 displaces water in the neighborhood of the screen 25 downward so that the surface of the water as it turns into the mica receiving table 1a cross the screen 25 and flows into the space 3b, thereby stripping off the clogged mica. If desired, an agitating means for scattering mica thrown into the water in the space 3a may be provided in the space 3a.

The foregoing description has been concerned with the manufacture of sheets composed of mica alone, but a mica sheet having superposed on one side a reinforcing material such as paper, glass cloth and the like may be manufactured by the arrangement shown in FIG. 4 where a reinforcing material in the form of thin sheet 23 is placed under the mica layer by paying it out from a pay-out roll 22 provided outside the water tank 1 and guided by a guide roll 21 beneath the endless band 14, concurrently with the above process whereby the mica layer from the cylindrical net 2 is superposed on and adheres to the reinforcing material 23 to be transported on the pick up endless belt 14. The flake mica layer applied with the reinforcing material 23 is separated from the pick-up band 14, and thereafter subjected to varnish treatment and dried in the usual manner. In this case, the surface of the reinforcing material applied to the mica layer may be treated with a binding agent to ensure close adhesion of the mica to the reinforcing material by water, to facilitate subsequent processing.

In this manner it is possible to obtain a mica sheet with a central mica layer sandwiched between reinforcing sheets, by superposing a reinforcing material such as glass cloth over the mica layer superposed on the reinforcing material at a suitable place in the course of travel on the pick-up band and squeezing laminated sheets between squeeze rolls with a binding agent also introduced between the upper reinforcing agent and the mica sheet.

By replacing the reinforcing material such as paper, glass cloth and the like with the already produced mica sheet a mica board consisting of a lamination of two or more sublayers of mica sheets may be readily obtained.

To form a lamination of two or more mica layers on the reinforcing material, an arrangement as shown in FIG. 5 may be employed consisting of two apparatus almost similar to that shown in FIG. 1 disposed side by side with the pick-up band 14 of the right hand apparatus arranged below the left hand end of the pick-up band 14 of the right hand apparatus. A sheet composed of mica alone is formed by the right hand apparatus shown in FIG. 1 in the same way as described above, while a reinforced mica sheet is formed by the left hand apparatus in the same manner as has been described with respect to the apparatus shown in FIG. 4, whereby the mica sheet produced by the right hand apparatus is superposed on and bound on the mica sheet produced by the left hand apparatus, thus obtaining a mica sheet consisting of a lamination of two layers of mica superposed on one side of the reinforcing material.

A mica sheet consisting of a lamination of two mica layers sandwiched between upper and lower reinforcing sheets may be obtained by the arrangement as shown in FIG. 6, by disposing right hand and left hand apparatus side by side in almost the same way as in the arrangement shown in FIG. 5 and rotating the cylindrical net 2 and the pick-up endless band 14 of the right hand apparatus in the counter-clockwise direction. With this arrangement, the upper half of the reinforced mica sheet with a formed mica layer at its low part which comes from the right hand apparatus may be made to coincide with the reinforced mica sheet with a formed mica layer at its upper part on the left hand apparatus.

In each of the above described methods, a soluble or dispersible binding agent may be added to water in the water tank 1, so as to attain stronger bonding of the flake mica particles to each other and between the flake mica and the reinforcing material by drying and in this way, it is possible to form the reinforced mica sheet with a binding agent layer of uniform thickness on the reinforced material.

Also, a water-soluble binding agent may be previously applied to the reinforcing material, so that the mica sheet may be inseparably attached to the reinforcing material. Furthermore, mica sheets may be piled on each other by any well-known suitable method to obtain a desirable thickness of mica sheet or board.

As has been described in the foregoing description, according to this invention it is possible to cause flake mica to float in water and accumulate mica in the form of a sheet of uniform thickness on the cylindrical net without excessive mica being accumulated on local places, and without eyes and openings in the accumulated sheet, which has heretofore been considered to be very difficult. Thus, flake mica sheet in the form of board or tape reinforced with such material as paper, glass cloth and the like and flake mica sheet in the form of board composed of single layer of closely accumulated web of flake mica may be obtained with high production efficiency.

Moreover, according to the invention, manual operation of rearranging the distribution of accumulated mica on the surface may be avoided without sacrificing the physical characteristics of sheets composed of flake mica.

For the purpose of giving those skilled in the art a better understanding of the invention, the following illustrative example is given.

EXAMPLE

The apparatus shown in FIG. 1 was used. The cylindrical net used was 63 cm. in diameter and 5 mm. in mesh size, the volume of space $3a$ was about 300 l., the volume of space $3b$ was about 45 l., the length of the shelter was 95 cm., the distance between the cylindrical net and the bottom of the water tank was 6 cm., the amount of supply water was 500 l./min., amount of discharge water discharged from the discharge pipe was 0 to 200 l./min., and amount of throw of flake mica was 130 to 150 g./min., and a flake mica of #6, S.D.L. (with area of 400 to 1000 mm.$^2$, thickness of 0.019 to 0.025 mm., and weight of 0.05 to 0.10 g.) was used. Under these conditions the apparatus was operated continuously for 60 minutes, the result was that 135 to 145 g./m.$^2$ of mica in the form of a layer having the average thickness of 0.08 mm. and the difference in thickness between thicker and thinner portions of 0.04 mm. was accumulated on the cylindrical net, with almost negligible eyes or opening in the layer of the order of less than 0.1% of the entire area of the layer.

A simple layer formed by accumulating about 150% of the aforementioned #6, S.D.L. flake mica on 1 m.$^2$ of the area had the ratio of eyes in the layer to the entire area of the layer of less than 1%, while the lamination of two layers formed under the same conditions and bonded to each other had the eye ratio of less than 0.01% and the lamination of three such layers had no eyes.

The standard difference in thickness between thicker and thinner portions of the three sublayer lamination was 0.03 to 0.06 mm. The nonpolished mica sheet consisting of one, two or more than three layers of mica obtained in the manner as described above may be used by itself.

While the invention has been described in connection with some preferred embodiments thereof, the invention is not limited thereto and includes any modifications and alterations which fall within the true spirit and scope of the invention as defined in the appended claims.

We claim:

1. An apparatus for manufacturing mica sheets from mica flakes, comprising in combination:

a fluid vat (1), means supplying a flow of water into and out of said vat;

a cylindrical net (2) rotatably disposed within the vat with a portion thereof extending above the level of water in said vat, means for rotating the net;

a water barrier partition (9) disposed within said vat along a portion of the outer circumferential surface of said net extending from above said water level to substantially around the bottom of said net;

first and second interconnecting sections ($3a$, $3b$) in said vat with a narrow arcuate passageway between said sections below said net, the first section being defined by the water barrier partition and one end of said vat and having a curved bottom, the second section being defined by the net and the other end of said vat, and the arcuate passageway being defined by the water barrier partition and the bottom of said vat;

water discharge means (6) within the net, and water overflow drain means (5) having an intervening screen (25) to prevent overflow of mica flakes into said drain means disposed at the side of the second section away from said net, said discharge means (6) and said drain means (5) connected in a closed system with said water supply means to maintain the water level, and also to maintain the water pressure within the cylindrical net lower than the water pressure outside the cylindrical net;

whereby mica flakes introduced into the first section will flow in a turbulent stream through said arcuate passageway and float into said second section and thence pass onto said net;

and conveyor means (12, 14) disposed adjacent to said cylindrical net for picking up a web or layer of flake mica adhering on the peripheral net and transporting the received mica layer.

2. An apparatus for manufacturing mica sheets according to claim 1, including a flow table (1a) between said intervening screen and said drain means (5).

3. An apparatus according to claim 1, including stirring means (26) in said second section near said drain means (5).

References Cited

UNITED STATES PATENTS

| | | | |
|---|---|---|---|
| 1,746,708 | 2/1930 | Mansfield | 162—334X |
| 1,765,533 | 6/1930 | Jespersen | 162—275X |
| 3,065,787 | 11/1962 | Rescheneder | 162—327 |

S. LEON BASHORE, Primary Examiner

A. L. CORBIN, Assistant Examiner

U.S. Cl. X.R.

162—321, 323, 327, 330, 334, 358